United States Patent [19]

Berrend

[11] Patent Number: 4,609,074
[45] Date of Patent: Sep. 2, 1986

[54] MULTIPLE OILER ASSEMBLY

[75] Inventor: Richard E. Berrend, New Holstein, Wis.

[73] Assignee: Oil-Rite Corporation, Manitowoc, Wis.

[21] Appl. No.: 747,678

[22] Filed: Jun. 24, 1985

Related U.S. Application Data

[63] Continuation of Ser. No. 630,981, Jul. 16, 1984, abandoned.

[51] Int. Cl.[4] .............................................. F16N 7/10
[52] U.S. Cl. ..................................... 184/81; 137/883; 137/884
[58] Field of Search .................. 184/81; 137/884, 883, 137/886; 403/362, 299

[56] References Cited

U.S. PATENT DOCUMENTS

| | | | |
|---|---|---|---|
| 552,194 | 12/1895 | Morgan | 184/81 |
| 756,282 | 4/1904 | Ranklin | 137/886 X |
| 804,033 | 11/1905 | Pedersen | 184/81 X |
| 2,646,856 | 7/1953 | Lyden | 184/81 |
| 2,837,174 | 6/1958 | Lyden | 184/81 |
| 2,938,698 | 5/1960 | Johnson | 403/362 X |
| 3,039,489 | 6/1982 | Botkin | 137/883 |
| 3,317,003 | 5/1967 | Lukas | 184/81 |
| 3,459,221 | 8/1969 | Axelrod | 137/883 |
| 3,656,584 | 4/1972 | Lyden | 184/81 X |

Primary Examiner—Leonard E. Smith
Attorney, Agent, or Firm—Andrus, Sceales, Starke & Sawall

[57] ABSTRACT

A multiple oiler assembly includes a plurality of valve members providing for the delivery of oil lubricant to corresponding lubrication points. Each valve member includes a first bore that extends laterally and opens to one side of the valve. The opposite side of the valve members is provided with a laterally projecting sleeve having a bore that opens to the remote end of the sleeve and extends coaxially with the first bore and communicates with the first bore to provide each valve member with a transversely extending oil lubricant through-passage. The outside diameter of the sleeve generally corresponds to the diameter of the first bore such that the sleeve of each valve member can be plugged into the first bore of the next preceding valve member to form a gang mounted valve member arrangement.

3 Claims, 4 Drawing Figures

MULTIPLE OILER ASSEMBLY

This is a continuation of application Ser. No. 630,981, filed July 16, 1984, now abandoned.

BACKGROUND OF THE INVENTION

This invention relates to a multiple oiler assembly and more particularly to the mounting of valve members in a gang arrangement.

U.S. Pat. Nos. 2,646,856 and 3,656,584 owned by the common assignee with this invention, disclose arrangements for gang mounting of valve members. In the patented structures tie rods or bars are required to secure the valve members or their manifold elements together. The tie rods and the recesses in which they are disposed must be machined with relatively close tolerances to be assured that the valve members or their manifold elements will be properly aligned. The length of tie rods also must be rather precise to be sure the sealing members between the valves or manifold elements are properly compressed. And since the number of valve units in a gang will vary in accordance with the machine to be lubricated, it is necessary with the patented structures to maintain a substantial and costly inventory of tie rod bars. If it subsequently is necessary to add a valve to an existing gang mounting, complete disassembly of the gang mounting is required as costly new and longer tie rods are also needed for the reconstituted gang. It is generally an object of this invention to provide for a gang mounted valve member arrangement that eliminates the need for tie rods and all their attendant problems.

SUMMARY OF THE INVENTION

According to the invention, an oiler assembly for the delivery of oil lubricant from supply means to a plurality of lubrication points includes a valve member corresponding to each lubrication point. Each valve member is provided with a laterally extending first bore that opens to one side of the member. A sleeve is provided on each valve member and projects laterally from the side of the valve member opposite from the opening of the first bore. The sleeve includes a second bore that opens to the remote end of the sleeve and extends generally coaxially with the first bore and communicates with the first bore to form a transverse oil lubricant through-passage in each valve member. Each valve member includes a valved passage that communicates with the through-passage to provide each lubrication point with the desired amount of oil lubricant. The sleeve of each valve member has an outside diameter generally corresponding to the diameter of the first bore such that the sleeve of each valve member can be sealingly plugged into the first bore of the next proceding valve member to form a gang mounted valve member arrangement.

DESCRIPTION OF THE DRAWING FIGURES

The drawings furnished herewith illustrate the best mode presently contemplated for the invention and are described hereinafter.

DESCRIPTION OF THE ILLUSTRATED EMBODIMENT

Figure 1:
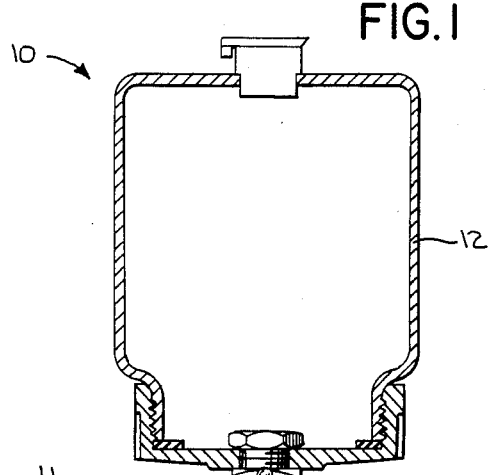
FIG. 1 is an elevational view, partially in section, showing the multiple feed oiler of this invention.
Figure 3:
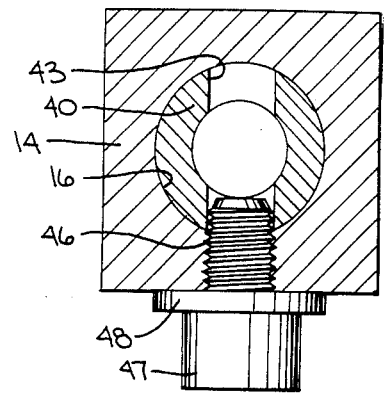
FIG. 3 is a sectional view taken generally on line 3—3 of FIG. 2.
Figure 4:
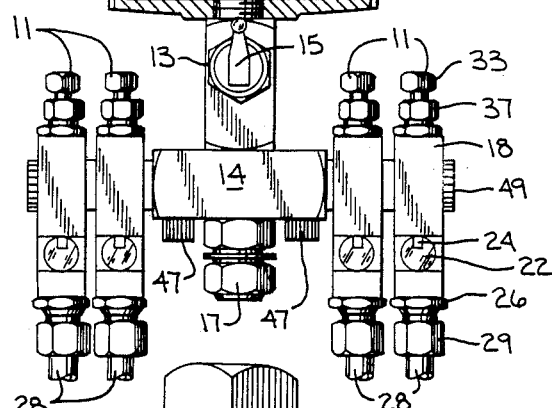
FIG. 4 is a sectional view taken generally on line 4—4 of FIG. 2.
Figure 4:
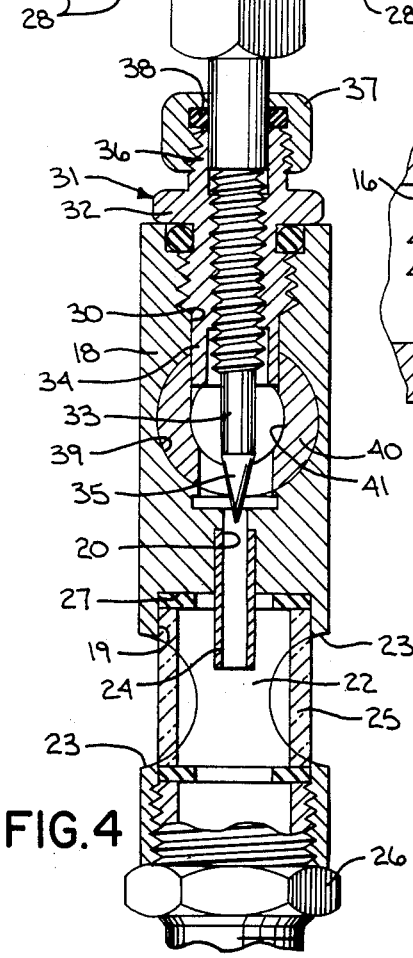

Referring to the drawings, the multiple oiler assembly 10 includes a plurality of gang mounted needle valves 11 receiving oil lubricant from the common reservoir 12 for delivery to select corresponding lubrication points of a machine, not shown. The flow from the reservoir 12 passes through the shut-off valve 13 of the assembly 10 and a hollow connector 14 to the respective needle valves 11. Flow shut-off to the valves 11 may be effected by a plunger, not shown, disposed in the shut-off valve 13 and operated by a toggle assembly 15 or other form of shut-off actuator.

The respective needle valves 11 are all generally identical. Their structure provides also for generally identical appearance in both the fore-and-aft directions so that the valves 11 may be disposed to either side of the intermediate connector 14.

The connector 14 is provided with a generally central, longitudinally extending through-bore 16 which communicates with a flow passage, not shown, through the shut-off valve 13. The connector 14 may further include means 17 for appropriately mounting the assembly 10 onto or relative to a machine, not shown.

Each of the respective needle valves 11 comprises a body 18 which is generally rectangular when viewed in plan. The body 18 of each valve 11 is provided with a stepped vertical through-bore 19 which includes a portion 20 of reduced diameter intermediate the length thereof and which provides an upwardly facing valve opening 21.

The valves 11 further have an enlarged portion of bore 19 opening downwardly to provide for a sight chamber 22 offering a visible check of valve performance. The valve body 18 is provided with fore-and-aft opposed sight openings 23 providing for viewing into the sight chamber 22. A nozzle 24 is press fit into the reduced diameter bore portion 20 and depends into the sight chamber 22 with the lower end of the nozzle in clear view through the sight openings 23. A length of transparent tubing 25 is coaxially and sealingly disposed in the chamber 22. A threadedly engaged hollow fitting 26 sealingly abuts the lower end of tubing 25 and secures the tubing in place between the fitting and the bore shoulder 27. A lubricant delivery line 28 is connected to the fitting 26 by the compression nut 29 and extends to the lubrication point, not shown.

The valve opening 21 communicates with an enlarged bore portion 30 that opens upwardly to receive the needle assembly 31. The assembly 31 includes a needle adaptor 32 which is sealingly and threadedly engaged within the upper end of the bore portion 30. The adaptor 32 is internally threaded to adjustably support the needle member 33. The needle member 33 extends downwardly through and projects from the annular sleeve 34 on the lower end of the adapator 32. The lower end of the needle member 33 is provided with a tapered portion 35 which in association with the valve opening 21 is adapted to control the flow of lubricant from the corresponding valve 11. An externally threaded sleeve 36 cn the upper end of the adaptor 32 supports an annular packing nut 37 for compressing an O-ring seal 38 against the needle member 33 to preclude ingress of deleterious matter around the needle.

The upper portion of the valve body 18 is further provided with a laterally extending bore 39 on an axis generally normal to the axis of the vertical bore 30. The bore 39 opens to one side of the body 18 and intercepts with and extends inwardly beyond the bore portion 30. The bore 39 in the needle valves 11 and the bore 16 in the connector 14 are of generally like dia- meter.

On the side opposite from the opening of bore 39, the valve body 18 is provided with a cylindrical sleeve projection 40 having a bore 41 opening to the remote end of the projection and extending generally coaxially with respect to bore 39 and communicating therewith. Thus, the bores 39 and 41 together form a transverse oil lubricant through-passage in each valve member 11. The sleeve projection 40 is stepped externally to provide an outwardly facing annular shoulder 42 spaced a given distance from the side of the valve body 18. The sleeve projection 40 outwardly from the shoulder 42 has an external diameter generally similar to that of valve body bore 39 and connector bore 16 and is adapted for plug-in reception into either of those bores as perhaps best shown in FIG. 2.

The sleeve projection 40 is provided with a vertical cross-bore 43 on an axis generally normal to the axis of the sleeve bore 41 and spaced outwardly from the shoulder 42. The distance between the shoulder 42 and the axis of the cross-bore 43 generally corresponds to the distance between the side of the valve body 18 containing the opening of bore 39 and the axis of the valve body bore 30, and the diameter of the cross-bore generally corresponds to the diameter of bore 30. Thus, when the sleeve projection 40 of one needle valve 11 is plugged into the bore opening 39 of the adjacent needle valve with engagement between the respective shoulder 42 and the side wall of the valve body 18, the cross-bore 43 and the body bore 30 will be coaxially disposed, such that upon installation of the needle assembly 31, the lower sleeve 34 on the needle adaptor 32 will project into the cross-bore 43 to interlock the adjacent needle valve members 11 together and provide for disposition of the tapered portion 35 of the needle member 33 in position to control the flow of oil lubricant through the bore opening 21 to the nozzle 24. Intermediate the shoulder 42 and the cross-bore 43 a peripheral groove 44 is provided on the sleeve projection 43 for receipt of an O-ring 45 to seal the projection within the bore 39.

The needle valve sleeve projection 40 is also sealingly engageable within the bore 16 at either end of the connector 14. A threaded opening 46 is provided adjacent to both ends of the connector 14 in alignment with the cross-bore 43 of a plugged in sleeve projection 40. A threaded member 47 is engageable within the opening 46 and projects into the cross-bore 43 to interlock the adjacent valve 11 to the connector 14 to prevent an involuntary disruption therebetween. A fiber washer 48 provides for sealing engagement of the threaded member 47.

While FIG. 1 shows but two (2) needle valves 11 disposed at the respective ends of the connector 14, any number of valves as needed may be included in the assembly 10 with each valve being interlocked to the valve next preceding. The end valves 11, however, must be provided with closure means.

Figure 2:
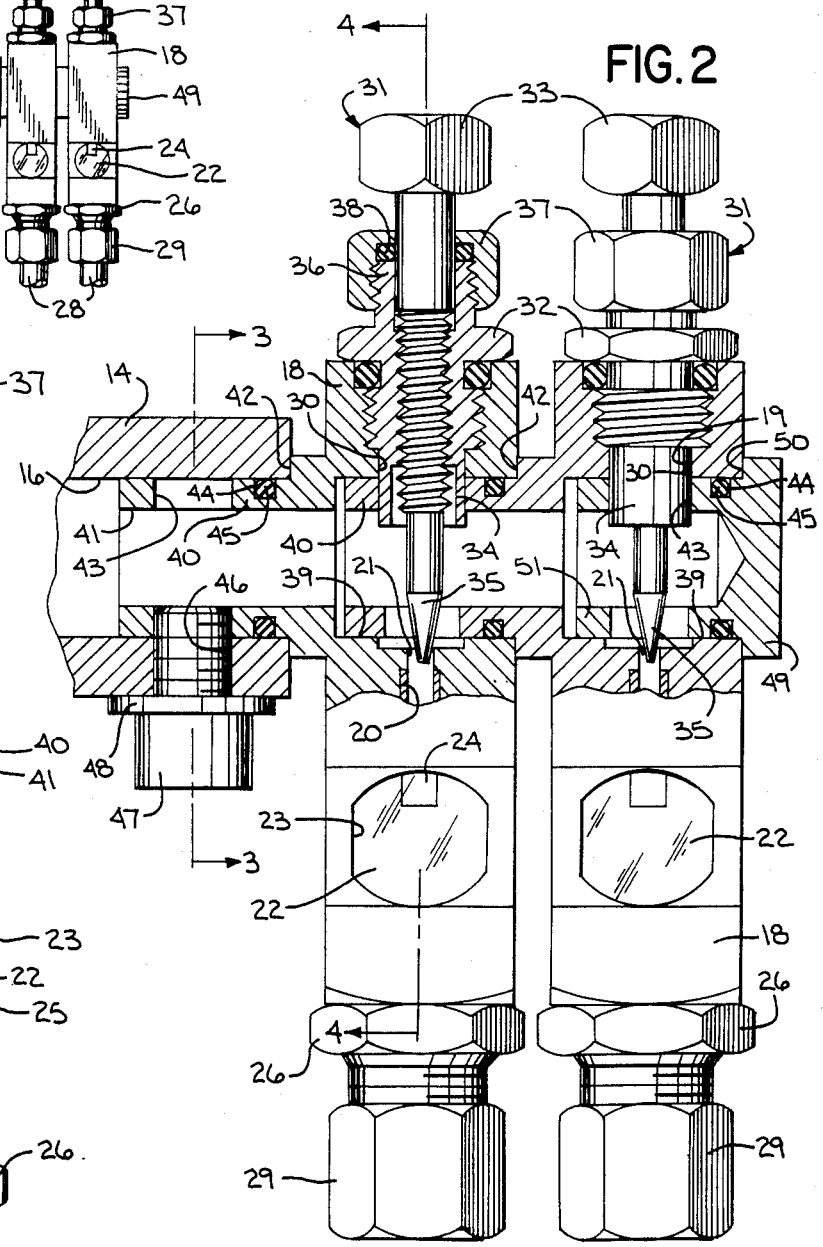
FIG. 2 is an enlarged partial elevational view, partially in section, showing details of the invention.

With particular reference to FIG. 2, the closure means for the end valves 11 comprise a hollow plug member 49 which includes an annular shoulder 50 engageable upon the remote side of the end valves generally similar to the shoulder 42 of the sleeve projection 40. Closure member 49 further includes a sleeve 51 generally similar to the sleeve projection 40. Like the sleeve projection 40, the sleeve 51 is provided with a crossbore 43 providing for interlock by the downwardly projecting needle adaptor sleeve 34 and the functioning of the tapered portion 35 of the needle member 33 relative to the exposed valve opening 21. The sleeve 51, like the sleeve projection 40 is also provided with a peripheral groove 44 for an O-ring 45 to seal the closure member 49 within the bore 39 of the end of the valve members 11.

If it ever became necessary to add one or more valves 11 to the oiler assembly 10 at some later date, that will be a rather simple matter. If the nature of the delivery lines 28 permit, the gang mounted valves can be interrupted by the removal of any one of the needle assemblies 31 and an unplugging of the corresponding sleeve projection 40 to provide for the insertion of an added valve member 11 at that point. Otherwise, the end closure plug 49 may be removed to permit a valve addition at the end of the gang mounting with the closure plug to be reinstalled in the added last valve.

Since each needle valve 11 of the oiler assembly 10 of this invention includes means for connecting a valve into a gang mounted arrangement, tie rods or other connecting means are eliminated to present a more orderly and neat appearance and to reduce inventory requirements. Subsequent valve additions to the gang mounted arrangement, if needed, will involve only the one or more additional valves without need for new and accommodating connecting means for the reconstituted gang arrangement.

Various modes of carrying out the invention are contemplated as being within the scope of the following claims particularly pointing out and distinctly claiming the subject matter which is regard as the invention.

I claim:

1. In an oiler assembly for the delivery of oil lubricant from supply means to a plurality of lubrication points, a valve member corresponding to each lubrication point, each valve member having a laterally extending first bore that opens to one side of the member, a sleeve on each said valve member projecting laterally from the side of the valve member opposite from the opening of said first bore, said sleeve providing a second bore that opens to the remote end of the sleeve and extends generally coaxially with said first bore and communicates therewith to form a transverse oil lubricant through-passage in each said valve member, each said valve member having a valved passage communicating with said through-passage to provide each lubrication point with the oil lubricant, said sleeve of each valve member having an outside diameter generally corresponding to the diameter of the first bore such that the sleeve of each valve member can be sealingly plugged into the first bore of the next preceding valve member to form a gang mounted valve member arrangement, and a needle assembly on each valve member and including a needle member for controlling the flow of oil lubricant through the corresponding valved passage, said needle assembly extending generally normal to and being interlocked with the sleeve of the next succeeding valve member to thereby prevent involuntary separation separation between the adjacent valve members.

2. In an oiler assembly for the delivery of oil lubricant from supply means to a plurality of lubrication points, a valve member corresponding to each lubrication point, each valve member having a laterally extending first bore that opens to one side of the member, a sleeve on each said valve member projecting laterally from the side of the valve member opposite from the opening of said first bore, said sleeve providing a second bore that opens to the remote end of the sleeve and extends generally coaxially with said first bore and communicates therewith to form a transverse oil lubricant through-passage in each said valve member, each said valve member having a valved passage communicating with said through-passage to provide each lubrication point with the oil lubricant, said sleeve of each valve member having an outside diameter generally corresponding to the diameter of the first bore such that the sleeve of each valve member can be sealingly plugged into the first bore of the next preceding valve member to form a gang mounted valve member arrangement, and a needle member in each valve member for controlling the flow of oil lubricant through the valved passage and an adaptor therefor, said needle member adaptor extending generally normal to and being interlocked with the sleeve of the next succeeding valve member to thereby prevent involuntary separation between the adjacent valve members.

3. In an oiler assembly for the delivery of oil lubricant from supply means to a plurality of lubrication points, a valve member corresponding to each lubrication point, each valve member having a laterally extending first bore that opens to one side of the member, a sleeve on each said valve member projecting laterally from the side of the valve member opposite from the opening of said first bore, said sleeve providing a second bore that opens to the remote end of the sleeve and extends generally coaxially with said first bore and communicates therewith to form a transverse oil lubricant through-passage in each said valve member, each said valve member having a valved passage communicating with said through-passage to provide each lubrication point with the oil lubricant, said sleeve of each valve member having an outside diameter generally corresponding to the diameter of the first bore such that the sleeve of each valve member can be sealingly plugged into the first bore of the next preceding valve member to form a gang mounted valve member arrangement, and a needle member in each valve member for controlling the flow of oil lubricant through the valved passage and an adaptor therefor, said sleeve of each valve member being provided with a cross-bore in spaced relation from the remote end thereof and generally parallel to its needle member and adaptor therefor, said cross-bore in assembled relation of the sleeve within the adjacent valve member being disposed generally coaxially with the valved passage, the needle member and the needle member adaptor to expose the valved passage for operation of the needle valve relative thereto, said needle member adaptor terminating with a sleeve that projects into the sleeve cross-bore to interlock with the next succeeding valve member to thereby prevent involuntary separation between the adjacent valve members.

* * * * *

UNITED STATES PATENT AND TRADEMARK OFFICE
CERTIFICATE OF CORRECTION

PATENT NO. : 4,609,074

DATED : September 2, 1986

INVENTOR(S) : Richard E. Berrend

It is certified that error appears in the above-identified patent and that said Letters Patent is hereby corrected as shown below: Title page:

At "[56] References Cited", U.S. Patent Documents, Delete "756,282, 4/1904 Ranklin" and substitute therefor ---756,282 4/1904 Rankin---;

In Col. 2, line 65, Delete "cn" and substitute therefor ---on---;

In Col. 3, line 7, Delete "dia- meter" and substitute therefor ---diameter---;

In Claim 1, col. 4, line 64, Delete "separation", first occurrence.

Signed and Sealed this

Seventh Day of April, 1987

Attest:

DONALD J. QUIGG

Attesting Officer

Commissioner of Patents and Trademarks